(12) United States Patent
Yano et al.

(10) Patent No.: US 12,427,819 B2
(45) Date of Patent: Sep. 30, 2025

(54) STRUT BEARING AND VEHICLE STRUT SUSPENSION

(71) Applicants: JTEKT CORPORATION, Kariya (JP); NAKANISHI METAL WORKS CO., LTD., Osaka (JP)

(72) Inventors: Hiroshi Yano, Kariya (JP); Ikuhisa Maeda, Kariya (JP); Yasuhiro Narazaki, Osaka (JP); Yoshio Horikawa, Osaka (JP); Shogo Fukada, Osaka (JP)

(73) Assignees: JTEKT CORPORATION, Osaka (JP); NAKANISHI METAL WORKS CO., LTD., Osaka (JP)

( * ) Notice: Subject to any disclaimer, the term of this patent is extended or adjusted under 35 U.S.C. 154(b) by 0 days.

(21) Appl. No.: 18/836,729

(22) PCT Filed: Feb. 18, 2022

(86) PCT No.: PCT/JP2022/006614
§ 371 (c)(1),
(2) Date: Aug. 7, 2024

(87) PCT Pub. No.: WO2023/157225
PCT Pub. Date: Aug. 24, 2023

(65) Prior Publication Data
US 2025/0249716 A1     Aug. 7, 2025

(51) Int. Cl.
*B60G 3/04* (2006.01)
*B60G 17/02* (2006.01)

(52) U.S. Cl.
CPC ............. *B60G 3/04* (2013.01); *B60G 17/021* (2013.01); *B60G 2204/418* (2013.01)

(58) Field of Classification Search
CPC ... B60G 3/04; B60G 17/021; B60G 2204/418
USPC ................... 280/124.145, 124.146, 124.147
See application file for complete search history.

(56) References Cited

U.S. PATENT DOCUMENTS

| | | | |
|---|---|---|---|
| 8,308,176 B2* | 11/2012 | Lenon | F16C 35/04 280/124.147 |
| 8,740,472 B2* | 6/2014 | Corbett | B60G 15/067 384/609 |
| 10,544,827 B2* | 1/2020 | Yano | F16C 19/10 |
| 10,753,389 B2 | 8/2020 | Blanchard | |
| 11,186,133 B2* | 11/2021 | De Lemps | B60G 15/02 |

(Continued)

FOREIGN PATENT DOCUMENTS

JP     2005-299837 A     2/2020

OTHER PUBLICATIONS

International Search Report for International Application No. PCT/JP2022/006614 dated Apr. 26, 2022 (2 sheets).

*Primary Examiner* — Toan C To
(74) *Attorney, Agent, or Firm* — Kratz, Quintos & Hanson, LLP

(57) ABSTRACT

A strut bearing includes an upper case, a lower case, an upper raceway ring held by the upper case, a lower raceway ring held by the lower case, and rolling elements that roll in a space between the upper raceway ring and the lower raceway ring. The upper case has an upper surface on which an annular recess is provided, and the annular recess contains an elastic member fitted thereinto. The elastic member includes a base in the recess and a protrusion protruding from the upper surface of the upper case.

4 Claims, 7 Drawing Sheets

(56) References Cited

U.S. PATENT DOCUMENTS

| | | | |
|---|---|---|---|
| 2005/0242542 A1* | 11/2005 | Handke | F16F 9/38 |
| | | | 280/124.155 |
| 2005/0247531 A1* | 11/2005 | Oota | F16F 9/58 |
| | | | 188/322.19 |
| 2007/0170684 A1* | 7/2007 | Ohkita | B60G 15/068 |
| | | | 280/124.147 |
| 2012/0161414 A1* | 6/2012 | Scolaro | B60G 15/068 |
| | | | 280/124.155 |
| 2017/0158012 A1* | 6/2017 | Hubert | F16C 33/761 |
| 2018/0194187 A1* | 7/2018 | Kashani | B60G 15/068 |
| 2020/0116196 A1 | 4/2020 | Blanchard | |
| 2020/0378438 A1* | 12/2020 | Morita | F16C 27/045 |
| 2023/0332689 A1* | 10/2023 | Sierra | B60G 15/068 |
| 2024/0066939 A1* | 2/2024 | Jeong | F16H 25/20 |

\* cited by examiner

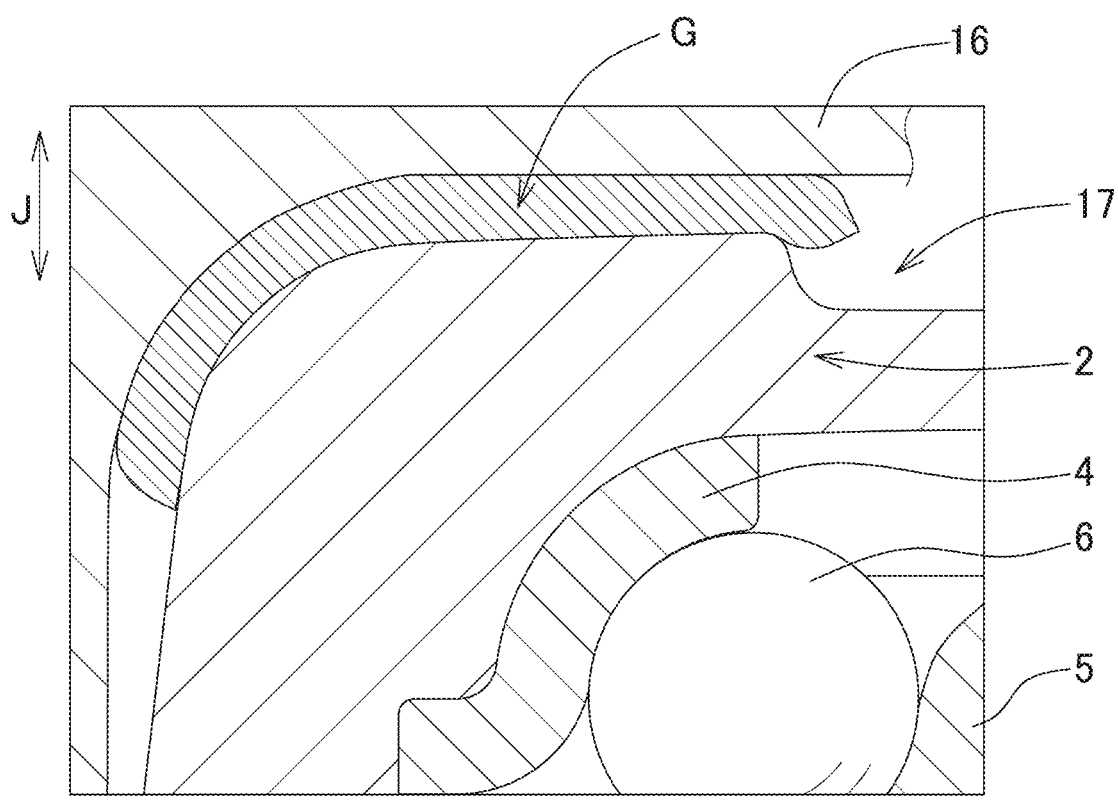

STRUT BEARING AND VEHICLE STRUT SUSPENSION

TECHNICAL FIELD

The present invention relates to a strut bearing used in a vehicle strut suspension.

BACKGROUND ART

As a suspension that supports a wheel on the body of a vehicle by means of a coil spring and includes a shock absorber for absorbing vertical vibrations, there is a strut suspension in which an extendable strut containing a shock absorber is fixed to an axle. The strut suspension is widely used, mainly for front wheels of an automobile.

As a strut bearing for use in an upper portion of the strut suspension (e.g., a suspension thrust bearing 1 in Patent Literature (PTL) 1), there is a strut bearing in which an elastic member (e.g., an upper isolator 9 in PTL 1) fixed to an upper case made of a synthetic resin (e.g., an upper cap 3 in PTL 1) is interposed between the upper case and an upper support (a support block in PTL 1).

The upper isolator 9 of PTL 1 is molded from an elastic material such as a thermoplastic elastomer (TPE), and includes a radial portion 90 and a tubular axial portion 91. The upper isolator 9 is firmly fixed to the upper cap 3 while the radial portion 90 abuts an upper surface of a flange 30 of the upper cap 3 and the tubular axial portion 91 abuts an inner peripheral surface of a hub 31 of the upper cap 3.

CITATION LIST

Patent Literature

PTL 1: Description in U.S. Pat. No. 10,753,389

SUMMARY OF INVENTION

Technical Problem

An elastic member like the upper isolator 9 of PTL 1 is interposed between the upper case and the upper support, thereby preventing relative slippage between the strut bearing and the upper support and also preventing generation of abnormal noise due to the slippage.

Here, the radial portion 90 of the upper isolator 9 in PTL 1 is fixed to the upper case while abutting the upper surface of the upper case. In such a case, when an axial load is input from a vehicle to the strut suspension, the radial portion 90 directly receives, in its entirety, the axial load. This causes the radial portion 90 to be deformed in a direction along which the radial portion 90 is not restrained. Thus, high stress may be generated in a part of the radial portion 90, which may cause the radial portion 90 to be damaged.

An object of the present invention is to provide a strut bearing and a vehicle strut suspension, which can prevent damage to an elastic member interposed between an upper case and an upper support.

Solution to Problem

A strut bearing according to a first aspect of the present invention includes an upper case, a lower case, an upper raceway ring held by the upper case, a lower raceway ring held by the lower case, and rolling elements that roll in a space between the upper raceway ring and the lower raceway ring. The upper case has an upper surface on which an annular recess is provided. The annular recess contains an elastic member fitted thereinto. The elastic member includes a base inside the recess and a protrusion protruding from the upper surface of the upper case. The upper surface of the upper case includes an annular flat portion located in a radially inside of the recess and an annular flat portion located in a radially outside of the recess. When a compressive force in an axial direction is applied to the strut bearing to compress the protrusion of the elastic member by a protrusion size of the protrusion, a lower surface of an upper support of the strut suspension comes into contact with the annular flat portions in the radially inside and outside of the recess in the upper surface of the upper case.

According to the above configuration, the protrusion of the elastic member protrudes from the upper surface of the upper case of the strut bearing. With this configuration, the elastic member is interposed between the strut bearing and the upper support, thereby preventing relative slippage between the strut bearing and the upper support, and also preventing generation of abnormal noise due to the slippage.

Furthermore, the base of the elastic member is buried in the annular recess on the upper surface of the upper case. With this configuration, the elastic member is positioned while being fitted into the upper case, thereby stably and surely maintaining a state in which the elastic member is positioned relative to the upper case, for a long period of time.

Still furthermore, when a load in the axial direction is input from a vehicle to the strut suspension and the projection of the elastic member is compressed by a size of the protrusion, the lower surface of the upper support comes into contact with the upper surface of the upper case, thereby distributing the load to the upper case. Therefore, the stress generated in the elastic member is reduced, thereby preventing damage to the elastic member.

In the strut bearing according to a second aspect of the present invention in the strut bearing according to the first aspect, a protrusion size D of the protrusion from the upper surface of the upper case is expressed as $0.05 \text{ mm} \le D \le 0.20 \text{ mm}$.

With this configuration, the protrusion size D of the protrusion of the elastic member is expressed as $D \ge 0.05$ mm. Accordingly, the interposition of the elastic member between the strut bearing and the upper support ensures effects of preventing the relative slippage between the strut bearing and the upper support and preventing generation of abnormal noise due to the slippage. Furthermore, the protrusion size D of the protrusion of the elastic member is expressed as $D \le 0.20$ mm, thereby reducing compressive stress when a compressive force acts on the elastic member and the elastic member is compressed by the protrusion size of the protrusion. Therefore, damage to the elastic member can be reliably prevented.

In the strut bearing according to a third aspect of the present invention in the strut bearing according to the first aspect or the second aspect, the upper case is made of a thermoplastic resin, and the elastic member is made of a thermoplastic elastomer.

With this configuration, the thermoplastic elastomer can be added, by overmolding through injection molding, to the upper case that has been molded by the injection molding, thereby facilitating the manufacturing.

A vehicle strut suspension according to a fourth aspect of the present invention includes the strut bearing according to any one of the first to third aspects.

The "annular recess" in the strut bearing according to the present invention conceptually includes a continuous annular-shaped recess and a discontinuous annular-shaped recess. Therefore, the "elastic member having the annular shape" in the strut bearing may have a continuous annular shape and a discontinuous annular shape.

Advantageous Effects of Invention

According to a strut bearing and a vehicle strut suspension of the present invention, damage to an elastic member interposed between an upper case and an upper support can be prevented.

BRIEF DESCRIPTION OF DRAWINGS

FIG. 9B is a vertical cross-sectional view of an enlarged main part, showing a deformation state in which the axial compressive force is applied to the analytical model of Comparative Example in the stress analysis of the elastic member.

DESCRIPTION OF EMBODIMENTS

Hereinafter, embodiments according to the present invention are described with reference to the drawings.

Figure 1:
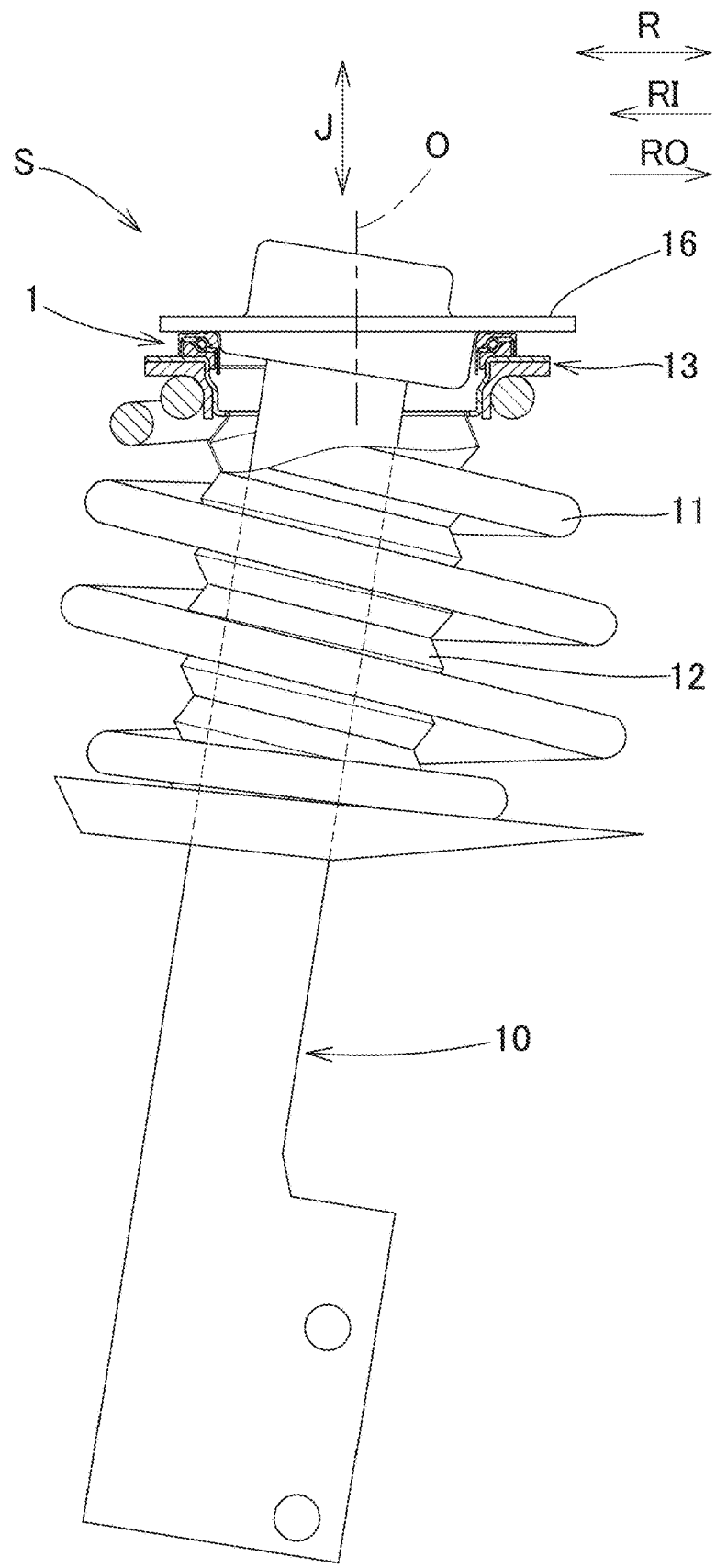
FIG. 1 is a schematic view with a partial cross-sectional view, showing a vehicle strut suspension including a strut bearing according to an embodiment of the present invention.

In the description of the present application, a direction parallel to a rotation axis O (see FIG. 1) of a strut bearing 1 is referred to as an "axial direction" (see an arrow J in FIG. 1, for example), a direction orthogonal to the rotation axis O is referred to as a "radial direction" (see an arrow R in FIG. 1, for example), the radial direction approaching the rotation axis O is referred to as a "radially inside" (see an arrow RI in FIG. 1, for example), and the radial direction away from the rotation axis O is referred to as a "radially outside" (see an arrow RO in FIG. 1, for example).

<Strut Suspension>

A vehicle strut suspension S shown in the schematic view with the partial cross-sectional view in FIG. 1 is used while an extendable strut 10 containing a shock absorber is fixed to an axle (not shown) and an upper support 16 is fixed to a vehicle body.

The strut suspension S is provided with, at its upper portion, a strut bearing 1 that supports the vehicle body and swings as much as a change in direction of steered wheels due to a steering operation. A swing angle of the strut bearing 1 is determined in accordance with an allowable steering angle of wheels, and is set in a range of 40 degrees or more and 50 degrees or less, for example.

A coil spring 11 serving as a suspension spring and a dust boot 12 for protecting an oil seal of the shock absorber from foreign matters such as sand are provided on the radially outside RO of the strut 10. The strut suspension S includes a spring support component 13 that supports an upper end of the coil spring 11. The spring support component 13 includes an upper spring seat 14 and an upper insulator 15, as shown in the vertical cross-sectional view of the enlarged main part in FIG. 2.

<Strut Bearing>

Figure 2:
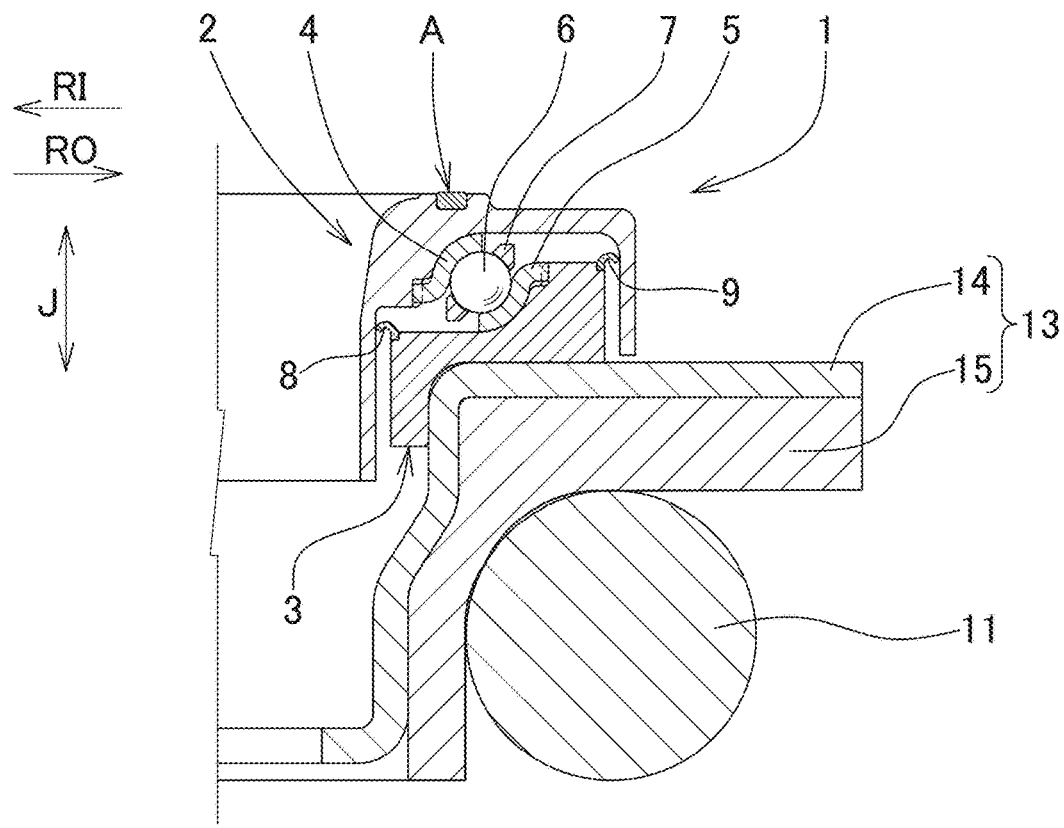
FIG. 2 is a vertical cross-sectional view of an enlarged main part of the strut bearing, an upper spring seat, an upper insulator, and a coil spring, according to the embodiment of the present invention.

As shown in the vertical cross-sectional view of the enlarged main part in FIG. 2, the strut bearing 1 according to the embodiment of the present invention includes an upper case 2, a lower case 3, an upper raceway ring 4, a lower raceway ring 5, rolling elements 6, a retainer 7, an inner diameter side seal 8, an outer diameter side seal 9, and the like. An elastic member A is fixed to the upper case 2.

The upper case 2 is fixed to an upper end of the strut 10, and the lower case 3 receives the upper spring seat 14 from above. The upper raceway ring 4 is held by the upper case 2, and the lower raceway ring 5 is held by the lower case 3. The rolling elements 6 roll in a space between the upper raceway ring 4 and the lower raceway ring 5, and the retainer 7 holds the rolling elements 6 in such a manner that the adjacent rolling elements 6 do not come into contact with each other.

The inner diameter side seal 8 is located in the radially inside RI of the rolling elements 6, and the outer diameter side seal 9 is located in the radially outside RO of the rolling elements 6.

<Details of Elastic Member>

Figure 3:
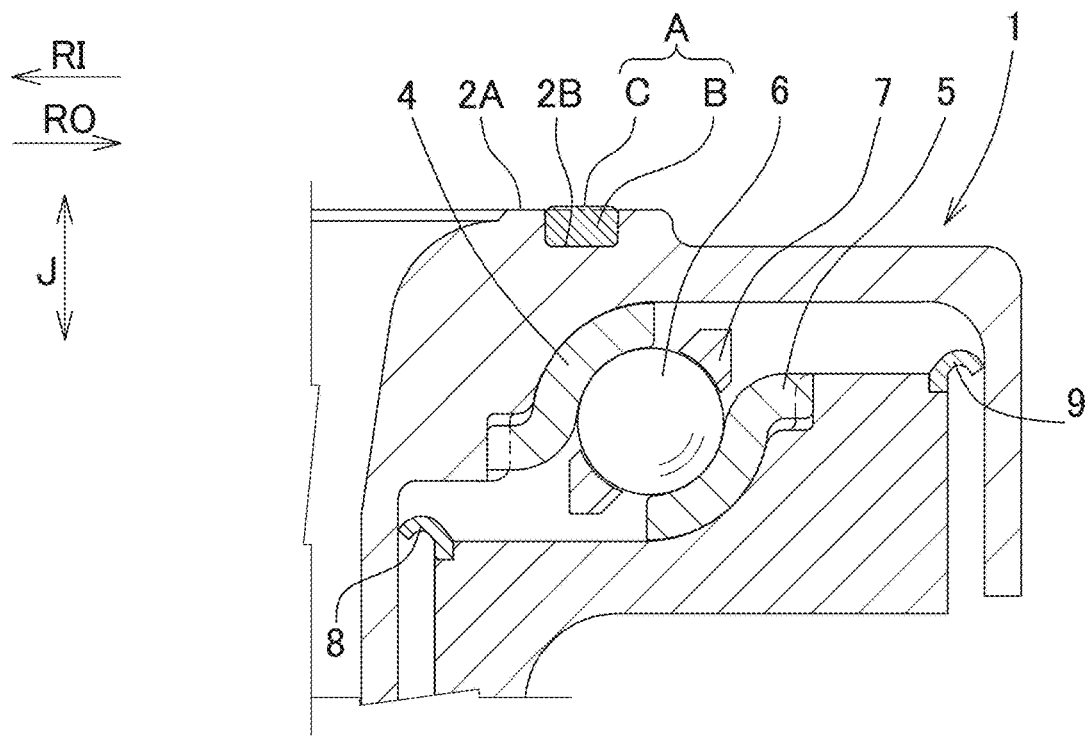
FIG. 3 is a vertical cross-sectional view of an enlarged main part of the strut bearing according to the embodiment of the present invention.
Figure 4:
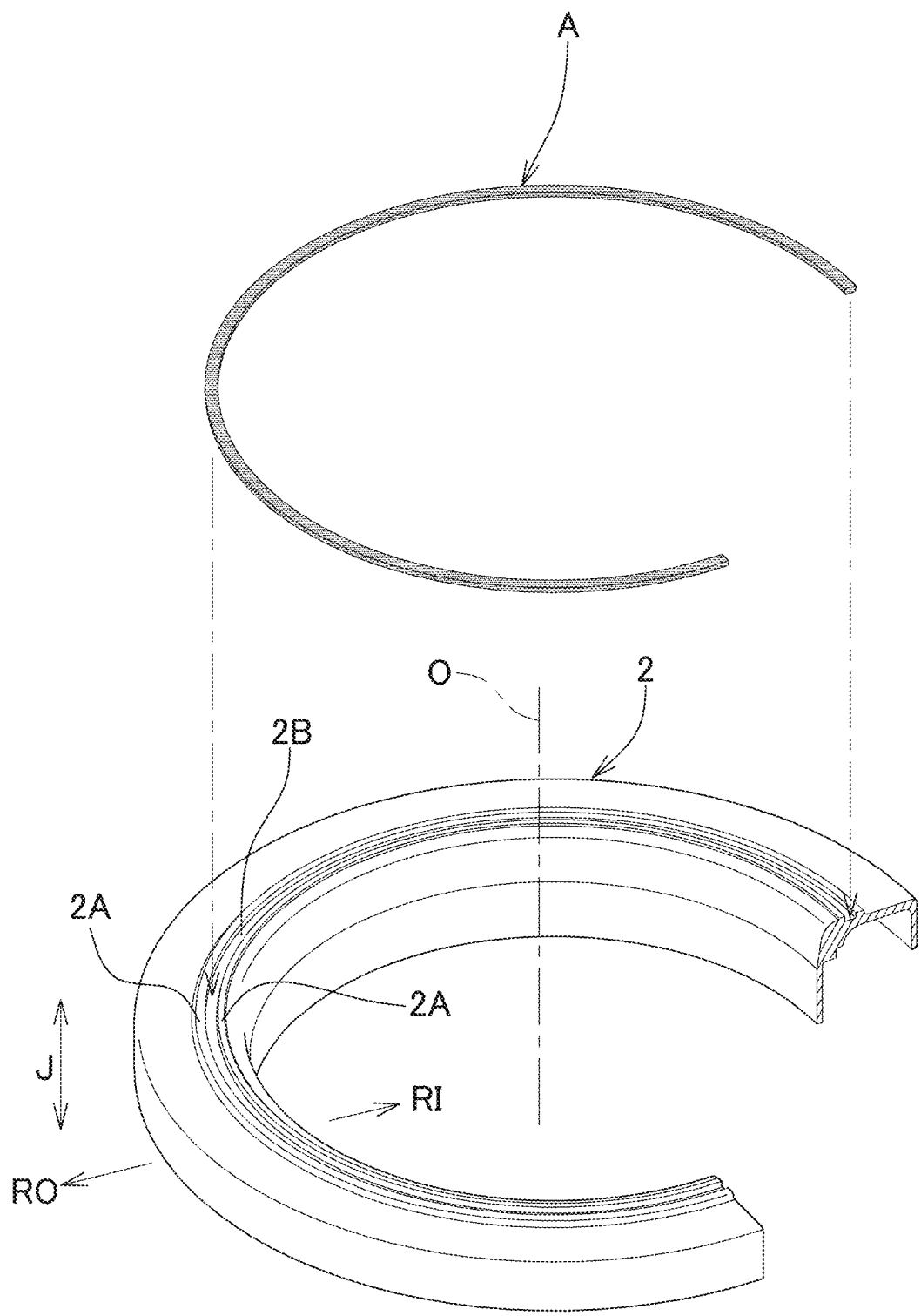
FIG. 4 is a perspective view with a partial cross-sectional view, showing the upper case and an elastic member separately.
Figure 5:
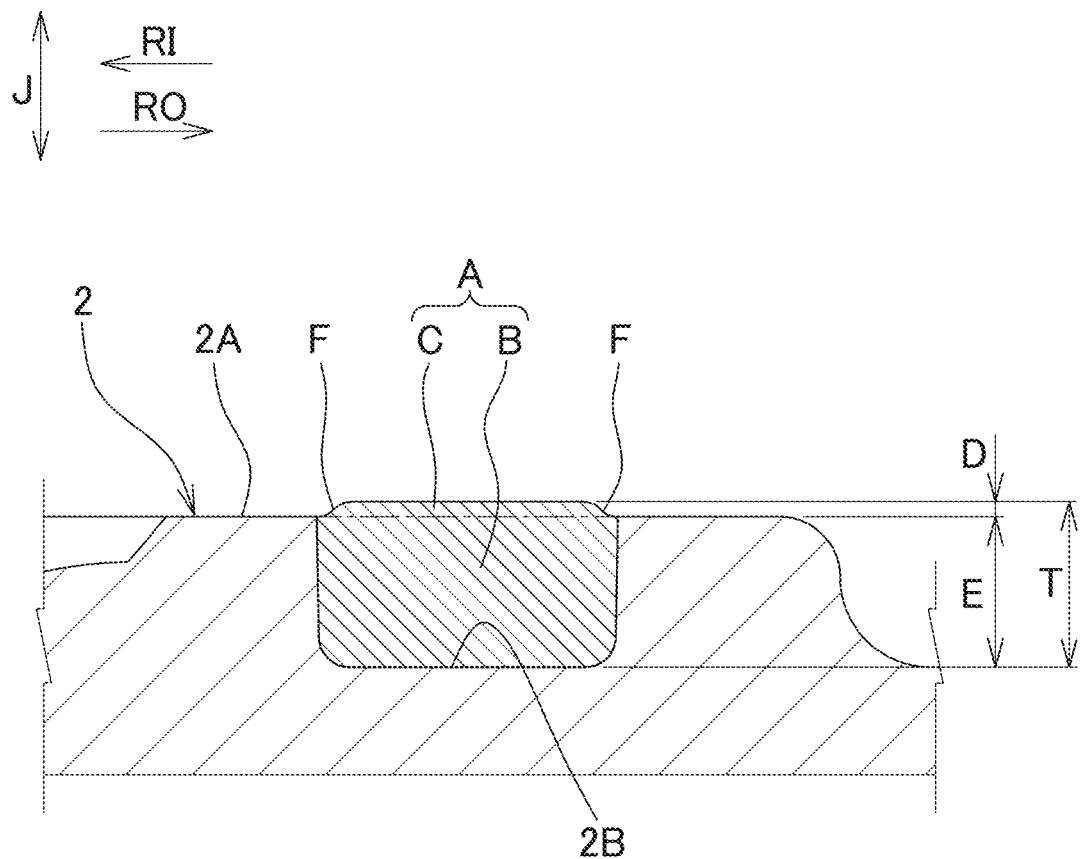
FIG. 5 is a vertical cross-sectional view of an enlarged main part around the elastic member.

An annular recess 2B is provided on an upper surface 2A of the upper case 2, as shown in the vertical cross-sectional view of the enlarged main part of the strut bearing 1 in FIG. 3, the perspective view with the partial cross-sectional view showing the upper case 2 and the elastic member A separately in FIG. 4, and the vertical cross-sectional view of the enlarged main part around the elastic member A in FIG. 5. As shown in FIGS. 4 and 5, the upper surface 2A includes an annular flat portion located in the radially inside RI of the recess 2B and an annular flat portion located in the radially outside RO of the recess 2B. In other words, the two annular concentric flat portions on the annular upper surface 2A are positioned to sandwich the recess 2B. As shown in FIG. 3, it is preferable that the recess 2B is disposed above a contact portion of the rolling elements 6 and the upper raceway ring 4.

The elastic member A has an annular shape and is fixed to the upper case 2 while being fitted into the annular recess 2B. Therefore, the elastic member A is positioned while being fitted into the upper case 2, thereby stably and surely maintaining a state in which the elastic member A is positioned relative to the upper case 2, for a long period of time.

As shown in FIGS. 4 and 5, the elastic member A includes a base B buried in the recess 2B of the upper case 2, and a protrusion C protruding from the upper surface 2A of the upper case 2. The protrusion C of the elastic member A protrudes from the upper surface 2A of the upper case 2 of the strut bearing 1. Therefore, the elastic member A is interposed between the strut bearing 1 and the upper support 16, thereby preventing relative slippage between the strut bearing 1 and the upper support 16 and generation of abnormal noise due to the slippage.

In a preferred embodiment, a protrusion size D of the protrusion C that protrudes from the upper surface 2A of the upper case 2 is expressed as 0.05 mm≤D≤0.20 mm.

The protrusion size D is set to D>0.05 mm, thereby surely preventing the relative slippage between the strut bearing 1 and the upper support 16 by the elastic member A that is interposed between the strut bearing 1 and the upper support 16, and also preventing the generation of abnormal noise due to the slippage.

The protrusion size D is set to D≤0.20 mm, thereby reducing compressive stress at a time when compressive force acts on the elastic member A and the elastic member A is compressed by the protrusion size D of the protrusion C. Therefore, damage to the elastic member A can be surely prevented.

As shown in FIG. 5, both end portions of the protrusion C of the annular elastic member A in the radially inside RI and the radially outside RO are respectively rounded slopes F. This can disperse stress concentration.

The material of the elastic member A is an elastomer. Examples of a thermoplastic elastomer (TPE) include a styrene type elastomer (TPS), an olefin type elastomer (TPO), a urethane type elastomer (TPU), an amide type elastomer (TPA), an ester type elastomer (TPEE), and the like. The styrene type elastomer (TPS) is particularly preferable, since the TPS has rubber-like elasticity and acts effectively as a non-slip material.

If the material of the elastic member A is the thermoplastic elastomer, the elastic member A can be added to the upper case 2 made of a thermoplastic resin by overmolding through injection molding, which facilitates manufacturing.

Figure 6:
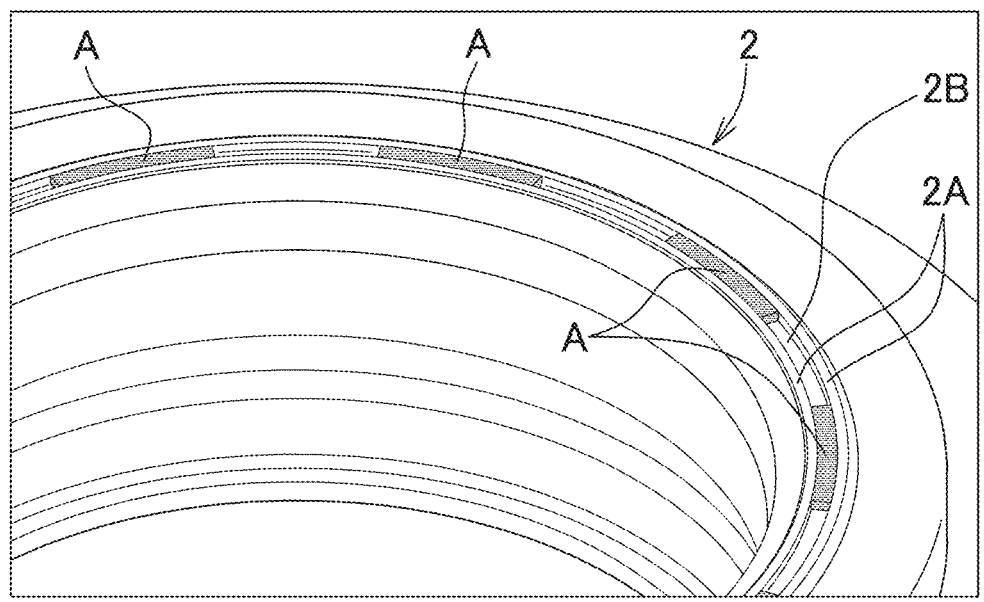
FIG. 6 is a perspective view of an enlarged main part, showing an example in which an annular recess has a continuous shape and the annular elastic member is discontinuously shaped.
Figure 7:
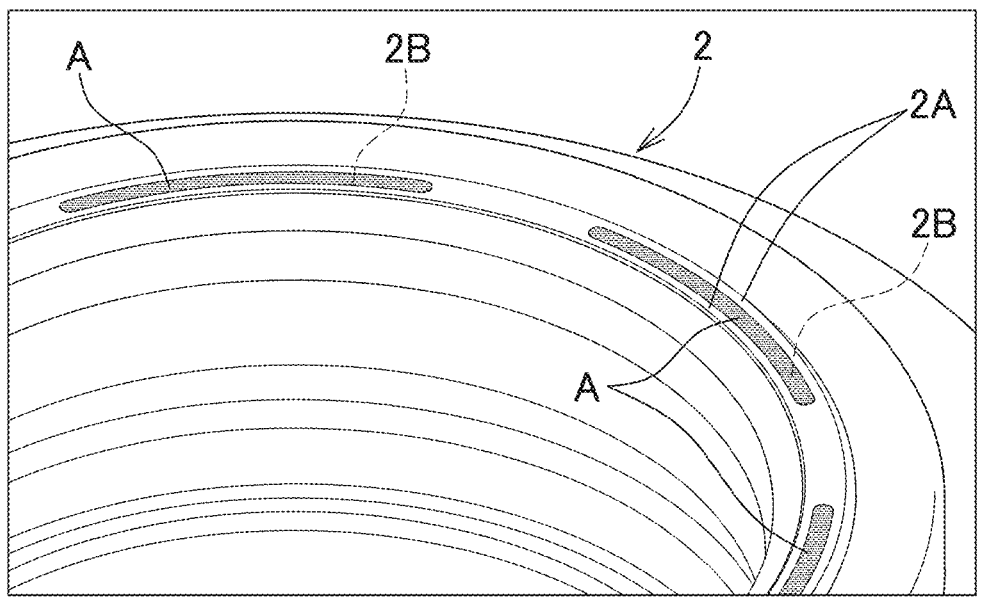
FIG. 7 is a perspective view of an enlarged main part, showing an example in which the annular recess and the annular elastic member are discontinuous.

The elastic member A may be a discontinuous member as shown in the perspective views of the enlarged main parts in FIGS. 6 and 7. If the elastic member A is a discontinuous member, the recess 2B of the upper case 2, into which the elastic member A is fitted, may also have a discontinuous shape that matches a shape of the elastic member A, as shown in the perspective view of the enlarged main part in FIG. 7.

<Materials of Main Parts Other than Elastic Member, and Molding Method>

The upper raceway ring 4, the lower raceway ring 5, and the upper spring seat 14 are made of steel, formed from a steel plate by press working, and quenched and hardened after undergoing the press working. The upper case 2 and the lower case 3 are made of a synthetic resin and are molded by the injection molding. The inner diameter side seal 8 and the outer diameter side seal 9 are made of an elastomer and are molded by the injection molding.

Examples of the synthetic resin used for the upper case 2 and lower case 3 includes, for example, polyamide-based synthetic resin (PA66, PA46, PA612, PA6, PA9T, PA10T, etc.), and contains, for example, 20 to 60% by weight of glass fiber (GF) as reinforcing fiber.

The elastomer used for the inner diameter side seal 8 and the outer diameter side seal 9 is the same as the material of the elastic member A.

<Stress Analysis of Elastic Member>

Analysis was performed by comparing stress applied to the elastic member A of the present invention, which was fitted into the annular recess 2B on the upper surface of the upper case 2, with stress applied to an elastic member imitating the "upper isolator" of PTL 1.

EXAMPLES

Figure 8A:
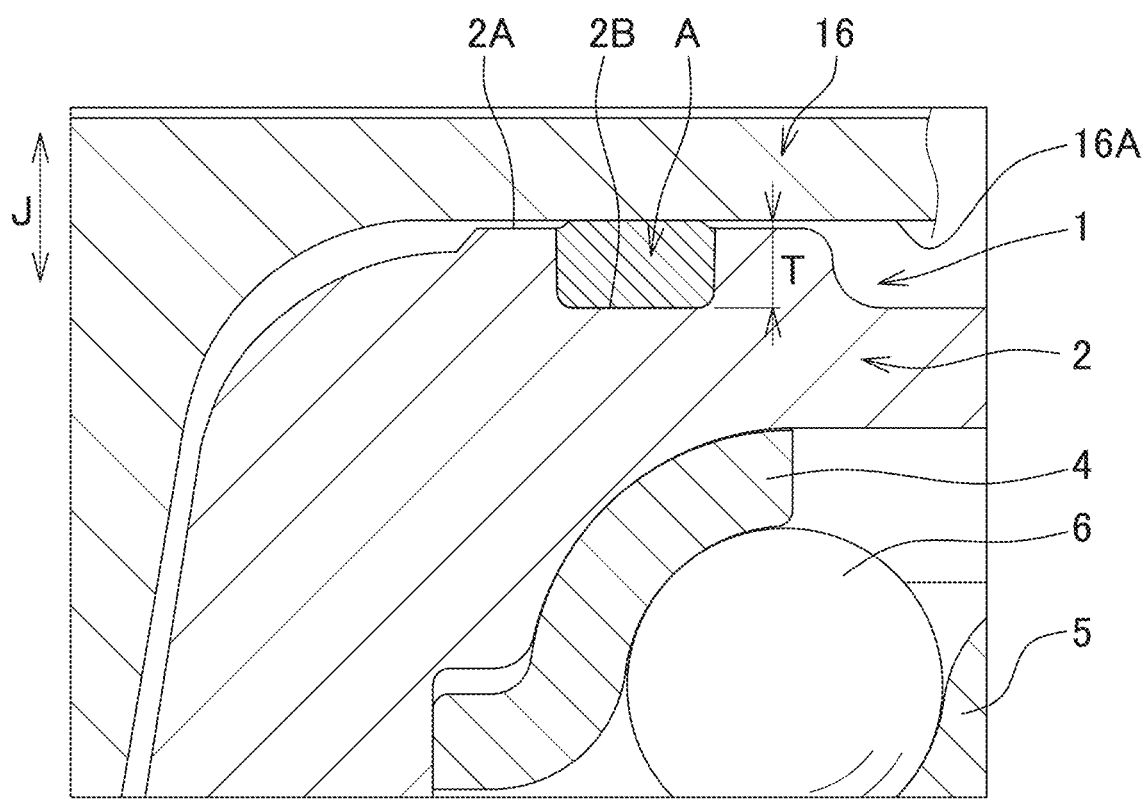
FIG. 8A is a vertical cross-sectional view of an enlarged main part, showing an unloaded state in which no axial compressive force is applied to an analytical model of Example 2 in stress analysis of the elastic member.

A thickness T in the vertical cross-sectional view of the enlarged main part around the elastic member A in FIG. 5 is set to 1.00 mm. Examples 1 to 4 are provided by preparing strut bearings 1 respectively including the elastic members A with protrusion sizes D of 0.05 mm, 0.10 mm, 0.15 mm, and 0.20 mm. The vertical cross-sectional view of the enlarged main part in FIG. 8A shows an analytical model of Example 2 in an unloaded state in which no compressive force in the axial direction J is applied.

COMPARATIVE EXAMPLE

Figure 9A:
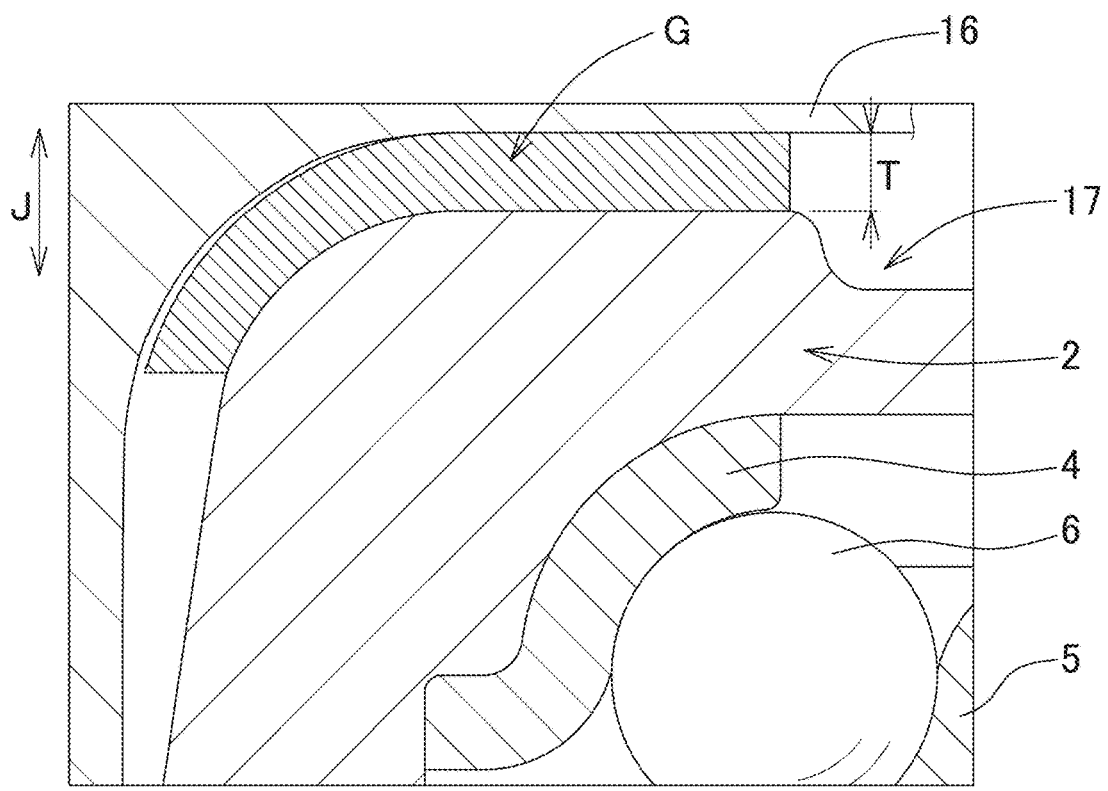
FIG. 9A is a vertical cross-sectional view of an enlarged main part, showing an unloaded state in which no axial compressive force is applied to an analytical model of Comparative Example in stress analysis of an elastic member.

A strut bearing including an elastic member imitating the "upper isolator" of PTL 1 is provided as Comparative Example. The vertical cross-sectional view of the enlarged main part in FIG. 9A shows an analytical model of the strut bearing 17 in Comparative Example in an unloaded state in which no compressive force in the axial direction J is applied. The strut bearing 17 includes an elastic member G imitating the "upper isolator". A thickness T of the elastic member G in FIG. 9A in the unloaded state is set to 1.00 mm.

(Analysis Method)

The elastic member A of the strut bearing 1 (FIG. 8A, for example) and the elastic member G of the strut bearing 17 (FIG. 9A) are made of the same elastomer material. The same compressive force in an axial direction J is applied to the elastic members A and G from the upper support 16 on a vehicle body side. The applied compressive force corresponds to a load in the axial direction J applied to the strut bearings 1 and 17 of a target vehicle. Maximum principal stress occurring in the elastic member A (Examples 1 to 4) and that occurring in the elastic member G (Comparative Example) are compared under a condition that the maximum principal stress occurring in Comparative Example is set to 1.

(Analysis Result)

Figure 8B:
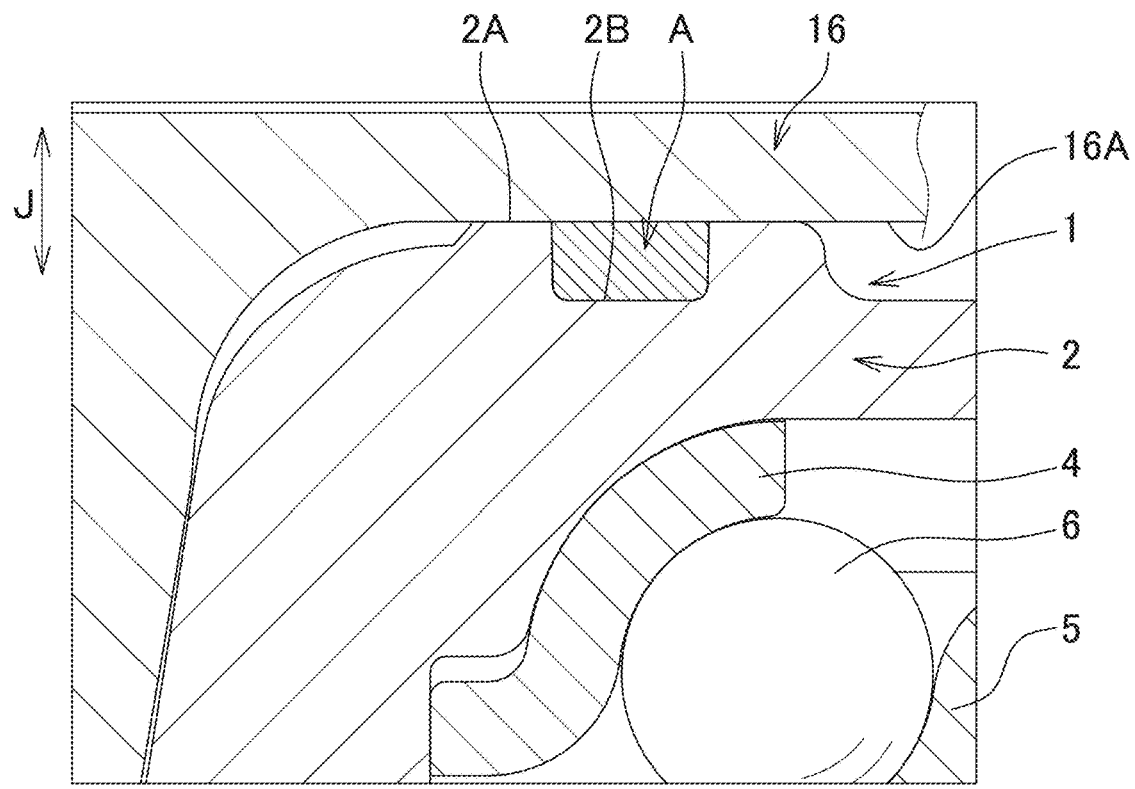
FIG. 8B is a vertical cross-sectional view of an enlarged main part, showing a deformation state in which the axial compressive force is applied to the analytical model of Example 2 in the stress analysis of the elastic member.

The analytical model of Example 2 deformed by receiving the compressive force of the above magnitude in the axial direction J is shown in the vertical cross-sectional view of the enlarged main part in FIG. 8B. The analytical model of Comparative Example deformed by receiving the compressive force of the above magnitude in the axial direction J is shown in the vertical cross-sectional view of the enlarged main part in FIG. 9B. Table 1 shows the maximum principal stress occurring in each of the elastic members of Comparative Example and Examples 1 to 4 when the compressive force of the above magnitude in the axial direction J is applied.

When the compressive force in the axial direction J is applied, the elastic member G of Comparative Example receives, in its entirety, the compressive force, and deforms as shown in FIG. 9B. In the elastic member A of Examples, in contrast, when the compressive force in the axial direction J is applied, the protrusion C is compressed by the protrusion size D (FIG. 5) as shown in FIG. 8B, causing a lower surface 16A of the upper support 16 to come into contact with the upper surface 2A of the upper case 2.

Table 1 shows that the maximum principal stress occurring in the elastic members of Example 1 (D=0.05 mm), Example 2 (D=0.10 mm), Example 3 (D=0.15 mm), and Example 4 (D=0.20 mm) is respectively 20%, 31%, 42%, and 48% relative to that of Comparative Example, which are significantly smaller than that of Comparative Example.

TABLE 1

| Comparative Example/Example | Elastic member Thickness T (mm) | Protrusion size D (mm) | Buried size E (mm) | Maximum principal stress occurring in elastic material (Comparative Example = 1) |
|---|---|---|---|---|
| Comparative Example | 1.00 | | | 1 |
| Example 1 | | 0.05 | 0.95 | 0.20 |
| Example 2 | | 0.10 | 0.90 | 0.31 |
| Example 3 | | 0.15 | 0.85 | 0.42 |
| Example 4 | | 0.20 | 0.80 | 0.48 |

In Examples 1 to 4, the maximum principal stress occurring in each of the elastic members is significantly smaller than that of Comparative Example. This is because the compressive force in the axial direction J is applied to the strut bearing 1 to compress the protrusion C of the elastic member A shown in FIG. 5 by the protrusion size D (FIG. 5), as shown in FIG. 8B, thereby causing the lower surface 16A of the upper support 16 to come into contact with the annular flat portions of the upper surface 2A of the upper case 2. Accordingly, not only the elastic member but also the upper case 2 receives load. The load is distributed in this way to reduce the stress occurring in the elastic member A, thereby preventing damage to the elastic member A.

Furthermore, the respective elastic members A of Examples 1 to 4 of the present invention (e.g., the elastic member A of Example 2 in FIG. 8A) have volumes significantly smaller than that of the elastic member G of Comparative Example in FIG. 9A. Therefore, material costs can be reduced.

The maximum strain (D/T) of the elastic member A of Example 4 satisfies: 0.2 mm/1 mm=0.2. Therefore, the thickness T of the elastic member A can be set so that the maximum strain is 0.2 or less. However, when the elastic member A is molded by the injection molding, it is preferable that the thickness T is 0.5 mm or more in consideration of fluidity of the thermoplastic elastomer.

The above description of the embodiments is all illustrative, and the present invention is not limited thereto. Various improvements and changes can be made without departing from the scope of the invention.

REFERENCE SIGNS LIST

1 Strut bearing
2 Upper case
2A Upper surface
2B Annular recess
3 Lower case
4 Upper raceway ring
5 Lower raceway ring
6 Rolling element
7 Retainer
8 Inner diameter side seal
9 Outer diameter side seal
10 Strut
11 Coil spring
12 Dust boot
13 Spring support component
14 Upper spring seat
15 Upper insulator
16 Upper support
16A Lower surface
17 Strut bearing
A Elastic member
B Base
C Protrusion
D Protrusion size
E Buried size
F Inclined surface
G Elastic member
J Axial direction
O Rotation axis
R Radial direction
RI Radially inside
RO Radially outside
S Strut suspension
T Thickness

The invention claimed is:

1. A strut bearing comprising:
an upper case;
a lower case;
an upper raceway ring held by the upper case;
a lower raceway ring held by the lower case; and
rolling elements that roll in a space between the upper raceway ring and the lower raceway ring, wherein
the upper case has an upper surface on which an annular recess is provided,
the annular recess contains an elastic member fitted thereinto,
the elastic member includes:
a base inside the recess; and
a protrusion protruding from the upper surface of the upper case,
the upper surface of the upper case includes an annular flat portion located in a radially inside of the recess and an annular flat portion located in a radially outside of the recess, and
when a compressive force in an axial direction is applied to the strut bearing to compress the protrusion of the elastic member by a protrusion size of the protrusion, a lower surface of an upper support of the strut suspension comes into contact with the annular flat portions in the radially inside and outside of the recess in the upper surface of the upper case.

2. The strut bearing according to claim 1, wherein the protrusion protrudes from the upper surface of the upper case by a size of 0.05 mm≤D≤0.20 mm.

3. The strut bearing according to claim 1, wherein
the upper case is made of a thermoplastic resin, and
the elastic member is made of a thermoplastic elastomer.

4. A vehicle strut suspension comprising
the strut bearing according to claim 1.

* * * * *